Dec. 16, 1969   N. L. SMITH   3,483,624
LINE-OF-SIGHT CLINOMETER
Filed June 13, 1968
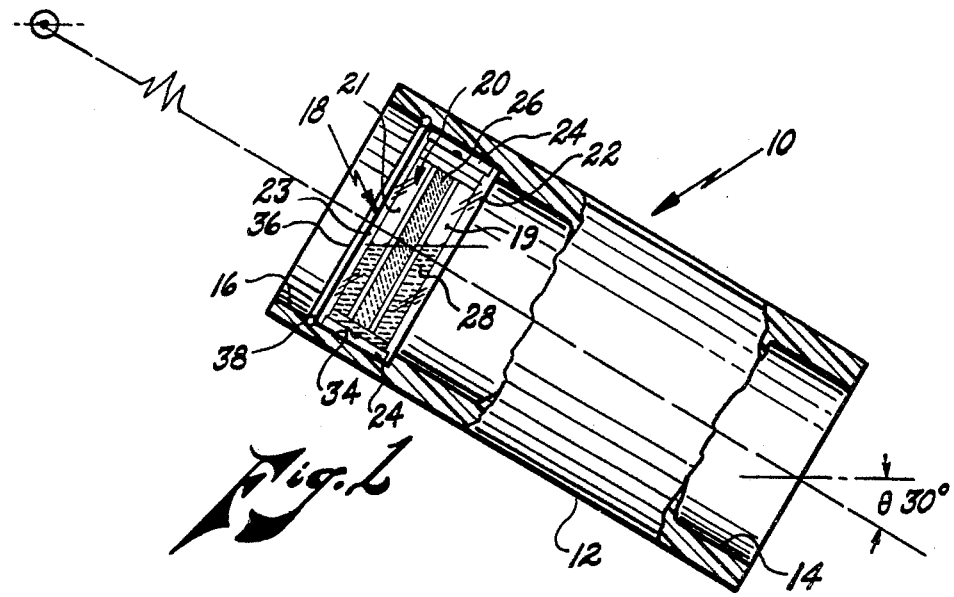
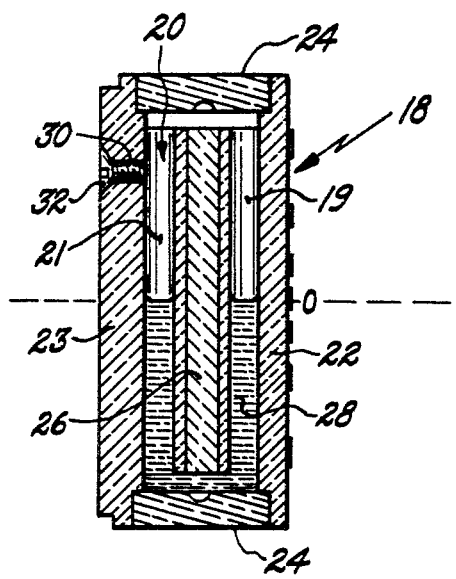
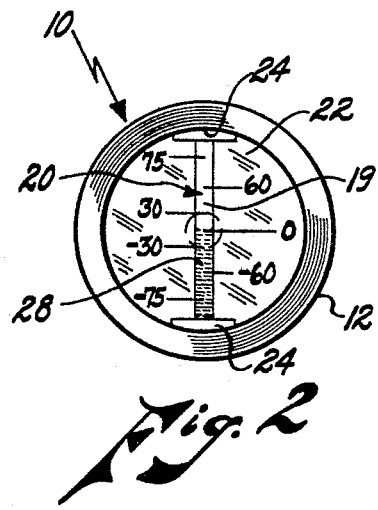
INVENTOR.
NORMAN L. SMITH
BY Harry A. Herbert Jr.
and Jacob N. Erlich
ATTORNEYS United States Patent Office 3,483,624
Patented Dec. 16, 1969

3,483,624
LINE-OF-SIGHT CLINOMETER
Norman L. Smith, 9 Acorn St., Malden, Mass. 02148
Filed June 13, 1968, Ser. No. 736,757
Int. Cl. G01c 1/02
U.S. Cl. 33—70
2 Claims

ABSTRACT OF THE DISCLOSURE

A line-of-sight clinometer having a tube-like outer structure and an angle determining means within the outer structure. The angle determining means being an endless tube having a colored fluid therein. When the clinometer is raised or lowered, the level of fluid changes, thereby enabling an observer to determine angular relations with respect to the horizontal.

BACKGROUND OF THE INVENTION

This invention relates generally to a device used to estimate the angle formed between an object located at a distance and a specific point of observation and, more particularly, to a dvice which is used to measure the angle between a horizontal line and a line-of-sight.

It becomes necessary under certain conditions to rapidly and accurately determine the angle which various objects located at a distance make with the point of observation. For example, under military conditions it may become essential that the angle of clearance over the height of trees be determined with respect to an artificial "horizon" without being able to see any actual horizon. It is equally important to measure an angle below the point of observation from, for example, a moving airplane or helicopter even in clouds when the true horizon may be obscured. It is also necessary to obtain certain line-of-sight data of cloudy or clear sky conditions at various angles with the horizon.

Heretofore, the above type determination of various angles was made by an estimate by men located on the ground or in an aircraft. Since these angular observations made by estimation by an unskilled observer left something to be desired, devices extremely complicated in structure and use were utilized in the above operations. These devices, however, although yielding sufficiently accurate results, have been found to be unsatisfactory in their employment not only because of the tendency of these devices to get out of order, but also because of the difficulties involved in manipulating the same by relatively untrained observers.

SUMMARY OF THE INVENTION

The device of the instant invention overcomes the above-mentioned shortcomings. The clinometer of the instant invention is designed to aid observers in making angular determinations either on the ground or in the air, whether or not any actual horizon can be seen. The device itself finds its main utility in that it is of extremely sturdy construction, highly compact, and its accuracy is sufficient for the purposes intended.

The device of this invention is a clinometer which embodies a tube preferably made of a hard plastic having an open end at one end thereof and having a graduated angle determining means at the other. The angle determining means is made up of a uniquely designed endless tube, upon which are inscribed or embossed graduated markings which designate degrees above and/or below the horizon. The endless tube is substantially an oval cavity of clear plastic particles filled with a colored fluid and having an opaque member between the two columns of fluid, such that as the fluid rises on one side "it seeks to level" on the other side, and vice versa. The endless tube is somewhat like a U tube except that it is connected at the top by an inverted U which completes the endless cavity. The observer or viewer looks through the open end of the clinometer as if he is looking through the open end of a telescope and reads the level of the fluid with reference to the graduated markings in order to determine the angle which the object he is looking at makes with the point of observation.

It is therefore an object of this invention to provide a device which enables line-of-sight data to be established.

It is a further object of this invention to provide a device which can be used in determining angular relationships between objects and which is accurate enough for the area of use intended and fast enough to be useful in emergencies where speed of determination is essential and vital.

It is another object of this invention to provide a device which is simple in theory and operation so that anyone could use it effectively and with comparatively little instruction and which would incorporate a minimum of probable error, either careless or functional.

It is a still further object of this invention to provide a device which is of extremely sturdy and compact construction.

It is still another object of this invention to provide a device for line-of-sight observation which is economical to produce and which utilizes conventional, currently available components that lend themselves to standard mass production manufacturing techniques.

For a better understanding of the present invention, together with other and further objects thereof, reference is had to the following description taken in connection with the accompanying drawing, and its scope will be pointed out in the appended claims.

DESCRIPTION OF THE DRAWING

FIGURE 1 represents a side elevation view partially in cross-section of the line-of-sight clinometer of this invention with the line-of-sight directed toward the target and at 30° from the horizontal;

FIGURE 2 represents an end view of the line-of-sight clinometer of this invention, as seen by an observer when looking through the open end of the clinometer; and FIGURE 3 represents a side elevation view in cross-section of the angle determining means of the line-of-sight clinometer of this invention.

DESCRIPTION OF THE PREFERRED EMBODIMENT

Referring now to FIGURE 1 which shows a side elevation view of the instant invention, the line-of-sight clinometer. 10. The clinometer 10 is made of a tube-like structure 12, preferably manufactured from a hard opaque plastic material. One end 14 is open and this is the end through which the viewing takes place. The other end 16 of tube-like structure 12 has mounted therein angle determining means 18 (shown more clearly in FIGURE 3).

Referring now to FIGURE 3, it can be seen that the angle determining means 18 is made up of a uniquely designed endless tube 20 made of any suitable material such as plastic. The endless tube 20 may be best described as a U tube having a forward column 19 and a rear column 21 and being connected at its top by an inverted U which completes the endless cavity. The endless tube 20 is sealed by transparent front side 22, transparent rear side 23, and top and bottom plugs 24, all of which may be made of any suitable material such as plastic. The endless cavity within endless tube 20 is partially filled with a colored fluid 28 made of any suitable liquid such as ½ Marvel Mystery Oil and ½ Esso No. 35 Bayol White Kerosene. The fluid 28 is inserted into the endless tube 20 through an inlet opening 30, which is in turn sealed by plug or screw 32. Inserted between the two columns 19 and 21 of endless tube 20 is an opaque center member 26 which has a width equal to the width of the endless tube 20, so that the eye of the observer sees only the fluid level in the column nearest him. This center member 26 may be made of any suitable opaque material such as opaque plastic.

Referring now to FIGURE 2, it can be clearly seen that the transparent front side 22 of angle determining means 18 has inscribed or embossed thereon, by any suitable method, angular markings. The amount of colored fluid 28 within the cavity of endless tube 20 is such that when the clinometer 10 is horizontal, half the fluid is in column 21 and half is in column 19 of endless tube 20, with the level on each column being at the 0° marking (shown in FIGURES 2 and 3) on the transparent side 22.

The angle determining means 18 is positioned within a recessed portion 34 of tube-like structure 12 of clinometer 10. Any suitable fastening means may be used to fixedly secure the angle determining means 18 in place. For example, one type of such a fastening means is a retaining snap ring 36 which is snapped into groove 38 of tube-like structure 12, press fitting the angle determining means 18 securely against the shoulder of recessed portion 34, after the angle determining means 18 is in place, thus preventing any rotation of the angle determining means 18. Alternatively, the snap ring may be replaced by using a suitable adhesive for fixedly securing the angle determining means in position. Thus, as clearly shown in the drawing, a highly compact and extremely sturdy clinometer has been set forth by the instant invention.

MODE OF OPERATION

The operation of the line-of-sight clinometer 10 is relatively simple and is therefore of great utility. The line-of-sight angle predetermined for an observation can be established by looking through the open end 14 of tube-like structure 12 and simultaneously moving the clinometer in either an upward or downward direction until the colored fluid 28 within the endless tube 20 lines up with the appropriate angular markings on the front side 22 of the angle determining means 18.

Alternatively, the angle at which an object is located can be established by merely looking through the open end 14 of the tube-like structure 12 and reading the angle, designated by the angular markings, which is adjacent the top of colored fluid 28 when the object viewed through transparent sides 22 and 23 lines up with the top of the colored fluid 28 within the angle determining means 18.

I claim:

1. A line-of-sight clinometer comprising an enclosing outer structure, a graduated angle determining means being fixedly secured within said outer structure, said angle determining means being made up of an endless transparent U-shaped tube connected at the top having a forward and a rear tubular column arranged in the same vertical plane, a colored fluid partially filling said tube and an opaque member fixedly secured to the rear of the forward column and between said forward and rear columns of said endless tube so that the eye of an observer sees only the fluid level in said forward column, and transparent means adjacent said forward tubular column having angle determining indicia thereon, whereby upward and downward movement of one end of said clinometer raises or lowers the level of said colored fluid within said angle determining means in order to establish the angle at which said end of said clinometer has been moved from the horizontal.

2. A line-of-sight clinometer as defined in claim 1 wherein said clinometer is made primarily of hard plastic.

References Cited

UNITED STATES PATENTS

| 718,330 | 1/1903 | Edwards. | |
| 753,940 | 3/1904 | Walker. | |
| 1,417,496 | 5/1922 | Carmean | 33—209 |
| 2,100,334 | 11/1937 | Horton | 33—209 |
| 2,109,044 | 2/1938 | Grieve. | |
| 2,335,893 | 12/1943 | Altenberg | 33—209 X |

FOREIGN PATENTS

| 194,150 | 12/1957 | Austria. |
| 498,044 | 9/1954 | Italy. |

HARRY N. HAROIAN, Primary Examiner

U.S. Cl. X.R.

33—209